(12) United States Patent
Haugen

(10) Patent No.: US 8,894,369 B2
(45) Date of Patent: Nov. 25, 2014

(54) METHOD AND MEANS FOR ENHANCING THE EFFICIENCY OF WATER TURBINES

(76) Inventor: Jan Otto Haugen, Trondheim (NO)

( * ) Notice: Subject to any disclaimer, the term of this patent is extended or adjusted under 35 U.S.C. 154(b) by 1653 days.

(21) Appl. No.: 12/441,853

(22) PCT Filed: Sep. 7, 2007

(86) PCT No.: PCT/NO2007/000316
§ 371 (c)(1),
(2), (4) Date: Jun. 3, 2011

(87) PCT Pub. No.: WO2008/035979
PCT Pub. Date: Mar. 27, 2008

(65) Prior Publication Data
US 2011/0250068 A1     Oct. 13, 2011

(30) Foreign Application Priority Data
Sep. 18, 2006 (NO) .................................. 20064206

(51) Int. Cl.
*F03B 7/00*     (2006.01)
*F03B 1/02*     (2006.01)
*F03B 11/02*    (2006.01)

(52) U.S. Cl.
CPC ............ *F03B 11/02* (2013.01); *F05B 2240/14* (2013.01); *Y02E 10/226* (2013.01); *F05B 2240/2411* (2013.01); *F03B 1/02* (2013.01); *F05B 2280/6003* (2013.01); *Y02E 10/223* (2013.01); *F05B 2280/4003* (2013.01); *F05B 2280/10* (2013.01)
USPC .................................. 416/197 A; 416/197 B

(58) Field of Classification Search
CPC .......... F03B 1/02; F03B 11/02; F03B 11/025; F03B 2240/14; F03B 2240/241; F03B 2240/2411; F03B 2280/10; F03B 2280/4003; F03B 2280/6003; Y02E 10/223; Y02E 10/226
USPC ............ 415/80, 81; 416/197 A, 197 B, 197 R
See application file for complete search history.

(56) References Cited

U.S. PATENT DOCUMENTS

| 1,448,893 | A | | 3/1923 | Wiki |
| 4,950,130 | A | | 8/1990 | Erlach |
| 5,440,175 | A | * | 8/1995 | Mayo et al. ................. 290/54 |

FOREIGN PATENT DOCUMENTS

WO    WO 2006/066691 A1    6/2006

OTHER PUBLICATIONS

Machine Translation of foreign document WO2006066691A1 dated Mar. 10, 2014.*
International Search Report mailed Jan. 23, 2008.

* cited by examiner

*Primary Examiner* — Dwayne J White
(74) *Attorney, Agent, or Firm* — Nixon & Vanderhye P.C.

(57) ABSTRACT

A water turbine with a rotatable turbine wheel having a wheel disc, buckets fixed to the wheel disc, and nozzle expelling a water jet on the bucket. The rotatable wheel and the nozzle are arranged in a casing with a water outlet. The interior of the casing reduces splash back of discharging water and detrimental water spray on the rotatable wheel. An energy damping device is attached on stationary, water splash exposed parts inside the turbine casing to dissipate energy from water of high velocity leaving the buckets and dense pulverized water mist.

14 Claims, 1 Drawing Sheet

METHOD AND MEANS FOR ENHANCING THE EFFICIENCY OF WATER TURBINES

CROSS RELATED APPLICATION

This application is the US national phase of international application PCT/NO2007/000316 filed 7 Sep. 2007 which designated the U.S. and claims priority to Norwegian Patent Application No. 20064206 filed 18 Sep. 2006, the entire contents of each of which are hereby incorporated by reference.

BACKGROUND OF THE INVENTION

The present invention relates to a method and means for enhancing the performance and efficiency of water turbines, in particular, but not exclusively, Pelton turbines.

Generally, when water at high pressure and/or velocity hits the parts of the turbine intended to be rotated, water has a tendency to splash, causing spray on the casing walls and/or on other parts of the turbine intended to be rotated. In particular, Pelton turbines are exposed to secondary losses originating from water of high velocity leaving the buckets, hitting stationary parts inside of the turbine casing and causing losses generated from i) splash back to the wheel and
ii) disturbances to the incoming jet of water.

Pelton turbines with wheels having a horizontal axis of rotation are in particular exposed to such losses. Such vagrant spray is detrimental and should be eliminated, or at least reduced.

Further, when water subjected to high pressure hits hard surfaces and obstructions at an angle, the water has a tendency to be highly pulverized, causing fine droplets and droplets of "compressed" mist inside the housing. Such droplets or mist of "compressed" droplets is another source of loss in a water turbine, causing so called "windage loss". "Windage loss" in a Pelton turbine comprises frictional losses and impact losses between rotating parts (running wheel) and particles in the atmosphere inside the casing surrounding the rotating parts. For a Pelton turbine, this means the rotational resistance which the wheel is subjected to inside the casing, caused by air containing "compressed" water droplets.

It has previously been proposed to keep vagrant water spray away from the turbine wheel and buckets on a Pelton turbine. In order to reduce vagrant spray on the rotating wheel and the buckets in a Pelton turbine having a horizontal axis of rotation, it has been proposed to provide the upper region of a turbine casing with vertical metal sheets parallel to the plane of the turbine wheel, while horizontal sheets are disposed opposite the high pressure nozzle in order to prevent water spray from reaching the upper region of the casing.

U.S. Pat. No. 4,950,130 discloses a Pelton turbine which includes a wheel disc with buckets, mounted within a casing on a rotatable shaft. At least one nozzle is provided for expelling a fluid jet tangentially of the disc onto the buckets. A partition divides the interior of the housing into a spray fluid and outlet region and an upper ventilation region. The partition is located so that more than half the turbine wheel rotates in the relatively dry ventilation region. The driving fluid falls from the buckets into a sump in the outlet region, while residual fluid is wiped off the turbine wheel by the partition. The ventilation region allows ventilation of the casing and also produces a flow of gas for increasing the pressure in the sump to improve outflow of fluid.

Internal flow observations by model testing of Pelton turbines reveal the existence of the physical loss phenomena due to internal water flow interactions inside the turbine casing. Development and design of flow guides by model testing is a common way to solve the problem. However, the process can be very time consuming, and sometimes gives only minor efficiency improvement.

Previous and existing approach to the problem of energy losses due to energy dissipation in water turbines due to splashing water, is to design and provide the turbine casing with physical flow guides and screens as described above. It is found by model testing, however, that even if flow guides are installed, only a minor part of the losses may be eliminated.

Applicants have developed enhancements intended to improve the performance, reliability and the efficiency of a water turbine.

The devices and methods disclosed herein may be applied to reduce the required size and volume of the turbine casing.

The devices and methods disclosed herein may be applied to provide a solution which may also be applied to existing turbines, thereby improving their efficiency and performance in a low cost manner.

The devices and methods disclosed herein may be applied to prevent vagrant water or secondary spray of water from hitting the rotating parts of the turbine.

The devices and methods disclosed herein may be applied to improve the atmospheric conditions inside the turbine casing, reducing the "windage losses".

The devices and methods disclosed herein may be applied to reduce vibration and noise originating from the turbine casing walls being exposed to water of high velocities and high frequency turbulences.

The devices and methods disclosed herein may be applied to eliminate or reduce secondary losses occurring inside a water turbine is provided.

The devices and methods disclosed herein may be used to enhance the efficiency and the performance of water turbines in general, and on Pelton turbines in particular, by attaching one or more energy damping devices on stationary, water splash exposed parts inside the turbine casing in order to reduce the amount of detrimental spray water on the rotating turbine wheel, thereby dissipating energy at least from water of high velocity leaving the buckets and/or from dense pulverized water mist.

It is feasible to enhance the efficiency and the performance of existing water turbines to include the devices disclosed herein without having to perform extensive and expensive re-construction or up-grading of existing turbines.

By covering the exposed walls and other stationary parts inside the turbine casing with the energy dissipating device, the energy that always is left in the water will be dampened out and the water will fall down without causing any negative effects. For new Pelton turbines, energy dissipating wall covers make it possible to reduce the main casing dimensions and to simplify the casing design, and still maintain a high level of performance. For upgrading of old, existing turbines, wall covers, if needed, may compensate for more costly introduction of flow guides and screens, for example of the guiding ribs type or the like.

Secondary efficiency losses may vary from 0.5% for new turbines, to 1-5% or more for old, existing turbines. Eliminating these losses will 1) improve the efficiency of the turbine,
2) increase reliability regarding given guarantees and
3) reduce production costs for high performance Pelton turbines.

Although production costs will increase somewhat due to the addition of the wall covers, the energy generation of the power plant in which the turbine is installed will increase due to increased efficiency, making such investment payable.

One embodiment of the proposed device may preferably be in the form of a simple, low-cost, standardized mat of a certain shape, width and thickness, preferably made from commercial materials. The mat is rolled out, trimmed to the actual wall or part dimension, and fixed to the walls. In addition to efficiency improvement, the mat also has a potential to reduce forces acting on stationary turbine parts at runaway conditions.

Atmospheric conditions inside the turbine casing may be improved using the devices and methods disclosed herein, causing reduction of the "windage losses", since the turbine casing walls being hit by water from the wheel buckets are covered by means for absorbing, dampening or dissipating energy.

Further, due to said means for absorbing, dampening or dissipating, the vibration and noise originating from the turbine casing exposed to water of high velocities and frequencies are reduced.

According to the present invention the detrimental effect of "aggressive" water is dampened by limiting detrimental back spray of water on to the running wheel and/or the water jet(s) leaving the water nozzles. Further, the so called "windage loss" is reduced.

SUMMARY OF THE DRAWINGS

The invention will in the following be described more detailed, with reference to the accompanying drawing, in which.

DETAILED DESCRIPTION OF IEEE INVENTION

Figure 1:
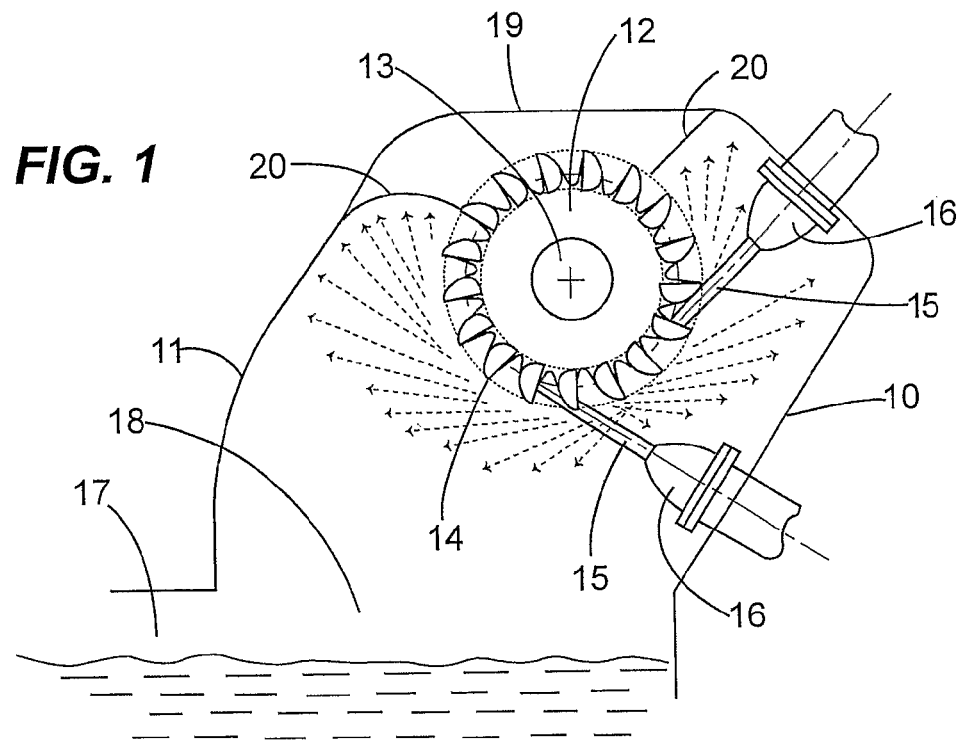
FIG. 1 shows schematically a vertical section through a horizontal Pelton turbine, indicating directions of water leaving the wheel.
Figure 2:
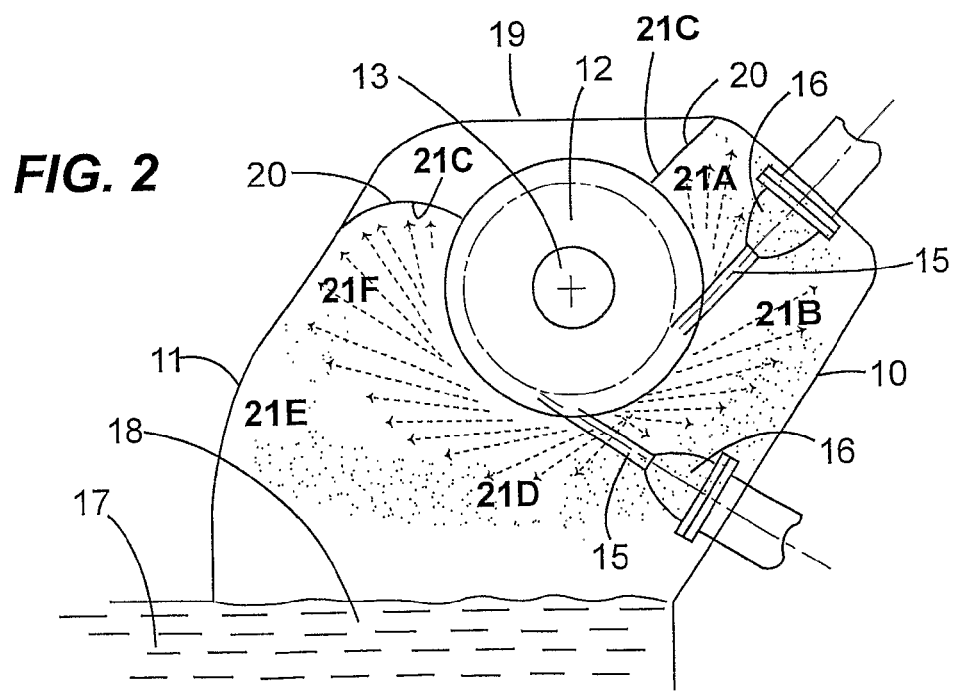
FIG. 2 shows schematically the vertical section through the turbine shown in FIG. 1, indicating water exposed areas inside the turbine casing.

The turbine 10 shown in FIGS. 1 and 2 comprises a casing 11, covering a running wheel 12 and a shaft 13, rotatably arranged in bearings (not shown) mounted in the walls of the casing 11. Along the periphery of the wheel 12, a large number of buckets 14 are arranged. When subjected to jets of water 15 from nozzles 16, impacting the buckets 14 at high pressure and/or velocity, the wheel 12 rotates at a high speed. According to the embodiment shown in FIG. 1 two nozzles 16 are used to rotate the wheel 12.

At its lower end, the casing communicates openly with a sump 17 through a fluid outlet 18, for discharging spent water which has been ejected into the buckets 14. At its upper end, the casing is provided with a top cover 19 and an inner partition 20, preferably contoured so as to form a dividing seal inside the casing. The arrows shown in FIG. 1 indicate the direction of water leaving the buckets 14 subsequent to impacting said buckets 14.

FIG. 2 indicates typical surface areas 21A-21F inside the casing 11, subjected to detrimental splashing. It should be appreciated that also the inner surfaces of the inner partitions are subjected to such detrimental splashing. Further, there are other surface areas than those indicated in the Figs. which also may be subjected to such detrimental splashing.

According to an embodiment of the present invention, the surface areas prone to detrimental splashing may be provided with surfaces suited for damping the back-splashing. Such surfaces may incorporate means for damping the splashing.

The means may be for example be mats fixed to the surfaces 21A-21F in any suitable manner, the mats being of a material and having a surface suitable for dissipating the energy of the splashing water. The mats may be made of a plastic materials, metal plates and/or a composite, e.g. with a surface texture suitable for improving the damping effect.

According to an alternative embodiment of the present invention, it should be appreciated that the damping means in addition to or in lieu of mats, may comprise metallic damping means such as chains fixed to the inner surfaces and/or expanded metals, gratings or the like.

According to an embodiment of the present invention, "energy dissipating wall covers" attached to walls and stationary components exposed to water inside Pelton turbines, are used to reduce or eliminate secondary turbine efficiency losses.

The invention may be used on all Pelton turbines, especially horizontal types, and both new and existing ones. It should be appreciated, however, that the present invention may also be used in any other type of water turbines where splashing or compressed droplets may be present, causing detrimental reduction of the efficiency of the turbine.

It should be appreciated that although the Figs. disclose a twin-jet Pelton turbine, the invention is also applicable for turbines having any number of nozzles, without deviating from the inventive idea.

The damping means may be made of chains, made of any suitable material, such as plastic materials, composite, metal or the like.

Alternatively, the damping means may comprise means such as expanded metal or grating, made of any suitable material, such as plastic materials, composites, metal or the like.

Alternatively, the damping means may comprise means such as cassettes of expanded metal or grating enveloping damping filling material chips made of any suitable material, such as plastic materials, composites, and/or metal or the like.

The invention claimed is:

1. A method for a water turbine having a turbine wheel, configured to be rotated, including a wheel disc, buckets fixed to the wheel disc, and at least one nozzle for expelling an incoming water jet on the buckets, wherein the turbine wheel and the at least one nozzle are arranged in a turbine casing with a water outlet, the method comprising:
   reducing splash back of water leaving the wheel on the turbine wheel by an energy-damping material attached on and conforming to a stationary, water-splash exposed surface inside the turbine casing to dissipate energy at least from high velocity water leaving the buckets and from a dense pulverized water mist, wherein the energy-damping material does not sealingly engage the wheel disc.

2. A method according to claim 1, wherein the energy-damping device material is trimmed and configured to conform to a wall of the stationary, water-splash exposed surface.

3. A method according to claim 1, wherein the-energy damping material is attached to flow guides inside the turbine casing.

4. A method according to claim 1, wherein the energy-damping material is attached to an interior surface of a single-jet or multi-jet Pelton turbine, the energy-damping material being configured to guide water away from the turbine wheel and the incoming water jet.

5. A water turbine comprising:
   a turbine wheel, configured to rotate, including a wheel disc and buckets fixed to the wheel disc;
   at least one nozzle expelling a water jet on the buckets;

a casing having a water outlet, wherein the turbine wheel and the at least one nozzle are arranged in the casing; and an interior of the casing including a splash back shield to deflect water leaving the wheel and a water spray on the rotatable turbine wheel, wherein the splash back shield includes damping material fixed and conforming to a stationary, water splash exposed surface inside the casing, wherein the damping material does not sealingly engage the turbine wheel.

6. A water turbine according to claim 5, wherein the damping material has a roughened exterior facing the water leaving the turbine wheel and the water spray.

7. A water turbine according to claim 6, wherein the roughened surface includes looped threads.

8. A water turbine according to claim 5, wherein the damping material includes chains formed of at least one of a plastic material, a composite, or a metal.

9. A water turbine according to claim 5, wherein the damping material includes expanded metal.

10. A water turbine according to claim 5, wherein the damping material includes cassettes of expanded metal, wherein the cassettes of expanded metal envelop damping filling material chips.

11. A water turbine comprising:
a turbine wheel, configured to be rotated, including a wheel disc and buckets fixed to the wheel disc;
a casing housing the turbine wheel, wherein the casing housing has a water-splash exposed surface proximate to the turbine wheel;
at least one nozzle in the casing housing configured to expel a water jet on the buckets;
a damping material fixed to and covering at least a portion of the water-splash exposed surface, wherein the damping material is selected from the group consisting of at least one of a mat, expanded metal, grating, and chains, wherein the damping material is not sealingly engaged to the turbine wheel.

12. A water turbine according to claim 11, wherein the damping material may be formed of at least one of a plastic material, a metal, or a composite material.

13. A water turbine according to claim 11, wherein the damping material includes an expanded metal forming an envelope containing material chips.

14. A water turbine according to claim 5, wherein the damping means includes a grating mesh.

* * * * *